United States Patent [19]

Asher

[11] Patent Number: 5,008,497

[45] Date of Patent: Apr. 16, 1991

[54] TOUCH CONTROLLER

[76] Inventor: David J. Asher, P.O. Box 8748, Albany, N.Y. 12208

[21] Appl. No.: 497,691

[22] Filed: Mar. 22, 1990

[51] Int. Cl.$^5$ ............................................. G08C 21/00
[52] U.S. Cl. ....................................................... 178/18
[58] Field of Search ................................ 178/18, 19, 20

[56] References Cited

U.S. PATENT DOCUMENTS

| | | | |
|---|---|---|---|
| 4,071,691 | 1/1978 | Pepper, Jr. | 178/19 |
| 4,129,747 | 12/1978 | Pepper, Jr. | 178/19 |
| 4,252,391 | 2/1981 | Sado | 339/60 R |
| 4,293,734 | 10/1981 | Pepper, Jr. | 178/19 |
| 4,302,011 | 11/1981 | Pepper, Jr. | 273/85 G |
| 4,314,227 | 2/1982 | Eventoff | 338/99 |
| 4,315,238 | 2/1982 | Eventoff | 338/99 |
| 4,475,008 | 10/1984 | Doi et al. | 178/18 |
| 4,570,149 | 2/1986 | Thornburg et al. | 338/114 |
| 4,587,378 | 5/1986 | Moore | 178/18 |
| 4,620,062 | 10/1986 | Mizzi et al. | 178/18 |
| 4,623,757 | 11/1986 | Marino | 178/18 |
| 4,752,655 | 6/1988 | Tajiri et al. | 178/18 |
| 4,810,992 | 3/1989 | Eventoff | 338/99 |
| 4,897,511 | 1/1990 | Haya et al. | 178/18 |

OTHER PUBLICATIONS

Yaniger, Applications Notes IL-01 and IL-03 Interlink Electronics, Santa Barbara, Calif.
Buxton et al, "Issues and Techniques in Touch-Sensitive Tablet Input", ACM 0-89791-166-0/85/007/0215, 1985.

Primary Examiner—Stafford D. Schreyer

[57] ABSTRACT

A touch controller is presented that comprises a touch sensor employing a resistive membrane, and an analog electronic circuit that accurately measures the touch position and the touch pressure on the sensor. Several variations of the electronic circuit are presented based on the principle of providing a constant current through the touch sensor, measuring the position with a differential amplifier, and measuring the touch pressure at the output of the current regulator. The touch sensors that may be used include resistive coatings such are used in overlays for computer displays, and force-sensing resistors. The circuits are simple, accurate and low-cost, yet provide measurements of the touch position that are fully decoupled from the pressure measurement, without approximation. The result is that the useful range of touch sensitivity is extended to include very light touches, without sacrificing position accuracy.

11 Claims, 11 Drawing Sheets

TOUCH CONTROLLER

BACKGROUND OF THE INVENTION

This invention relates to devices for providing information, in the form of electric signals, about the position and pressure of a selected touch point on a touch sensor that employs a resistive membrane. In particular, these devices are used as man-machine interfaces.

In general computing applications, this invention can be used as a two-axis pressure-sensitive touch controller. As such, it can perform the cursor control functions of a mouse, joystick, or trackball, with the enhanced feature that the pressure signal provides an additional independent control dimension. In the paper "Issues and Techniques in Touch-Sensitive Tablet Input", 1985 ACM 0-89791-166-0/85/007/0215, which is incorporated by reference herein, William Buxton et al. discuss human-factors issues in using touch tablets for human-computer interaction, and in particular cite the need for a pressure-sensitive touch tablet.

In dedicated control applications, a single-axis pressure-sensitive touch controller can perform the functions of a traditional potentiometer of fader. When combined with an LED or LCD display, a solid-state fader can be constructed that may be as easily controlled by a computer as by a human.

A two-axis pressure-sensitive touch controller is also a versatile and sensitive controller for specific computer applications. These include musical performance controllers and video game controllers.

U.S. Pat. Nos. 4,071,691 and 4,129,747 describe a two-axis pressure-sensitive touch controller that requires the user to make physical and electrical contact between two surfaces. One surface is a resistive layer deposited on an insulating substrate, with a periodic signal applied across it. Adjacent to the resistive surface is a second surface which is a conducting plate that detects the signal from the first surface as it passes through the hand of the user. This device restricts the movement of the user because it requires the user to touch two surfaces simultaneously.

The deficiencies of the two-surface approach were later solved with U.S. Pat. No. 4,293,734, which is especially useful for touch screens that overlay computer displays. Current-to-voltage converters are connected to the corners of a resistive layer in order to provide periodic voltage sources that also measure the currents that the voltage sources provide. These currents will change as a function of the impedance presented by the user's body at the touch point.

This method eliminates the need for the second pickup plate, however it requires the position voltages to be divided by the magnitude of the total current drawn by the user's finger, which is equivalent to the sum of all the position voltages. This current is dependent upon several factors that are not easily controllable, such as the area of the electrical contact beneath the fingertip, the impedance of the electrical connection at the touch point, and the extent to which the user is grounded.

Further, a division operation in any form (i.e. digital or analog) tends to reduce the accuracy of the data, but it is especially difficult to perform true linear division using simple analog circuitry. Nonlinearity in the division operation would have the effect of coupling the pressure and position measurements, so that changes in pressure would perturb the position measurement.

An alternative approach is disclosed in U.S. Pat. No. 4,570,149, which does not require the user to make direct electrical contact with the resistive layer, and further provides position measurements that do not require division operations. A voltage supply layer is constructed by depositing closely spaced parallel conducting traces on an insulating substrate, and connecting one end of each conducting trace to a common resistive trace.

A pickup layer is constructed by depositing a conducting material on a flexible insulating substrate. The pickup layer is mounted over the supply layer, so that the two layers make electrical contact when a user presses on them. In order to form a two-axis touch pad, two assemblies each containing a supply layer and a pickup layer are superimposed such that the conductive traces in each assembly are orthogonal to each other.

One end of each resistive trace is connected to a common voltage source, and the other end is left open. Each pickup layer conducts the current from the voltage source through some portion of the resistive trace that represents the position of the touch point. This current is used in a timing circuit to charge a capacitor, resulting in a time constant that is proportional to the position of the touch point.

Another possible method for determining the touch point using this touch sensor, as described in U.S. Pat. No. 4,587,378, is to connect two different voltage sources to either end of the resistive trace, establishing a potential gradient that causes successive conductive traces to be maintained at linearly increasing voltage. A potentiometer is thus formed where the pickup layer behaves electrically as does the wiper of a potentiometer, transmitting the voltage at a particular conductive trace, which in turn is a linear function of position.

Another touch sensor is described in U.S. Pat. No. 4,897,511, which employs two resistive sheets that are brought into contact at the touch point. A constant current source is applied to one edge of the upper sheet, with one edge of the lower sheet connected to circuit ground through a resistor. The resulting voltage drops from the edges of each sheet to the touch point are detected with differential amplifiers.

Although these devices may function well, they are not pressure-sensitive, but may serve as the basis for a pressure-sensitive touch controller.

The conducting supply traces carrying the position voltages are interdigitated with conducting pickup traces that are all electrically connected, so that the supply traces and the pickup traces are deposited on the same substrate but are electrically isolated from each other. A layer of force-sensing resistor (FSR) material is deposited on a flexible insulating substrate which is mounted over the voltage trace layer so that when a user presses on the assembly, the FSR will shunt a supply trace with an adjacent pickup trace.

An FSR is a passive material that has the property that its electrical resistance changes in response to an applied force. Greater applied forces result in smaller resistances, and the removal of force appears as an open circuit (infinite resistance). FSR materials are described in U.S. Pat. Nos. 4,314,227 and 4,315,238. U.S. Pat. No. 4,252,391 discloses a different material that also changes its regional resistance as a function of force, and can be formed into thin sheets.

The resulting touch-sensitive sensor, called a force-and-position sensing resistor (FPSR), is manufactured by Interlink Electronics, Inc. of Santa Barbara, California, and is described in their Applications Notes IL-03, which is incorporated by reference herein, as well as in U.S. Pat. No. 4,810,992. The method suggested in this literature for measuring the touch position is based on the potentiometer method as described above.

Schematically, the FSR is electrically connected in series between the wiper of the potentiometer (the pickup traces) and the supply traces. In order to measure the resistance of the FSR so that the touch force may be determined, the terminals at the voltage supply traces are reconfigured so a constant potential is established on all of the supply traces, and a fixed pulldown resistor is connected from the pickup traces to ground. The voltage across the pulldown resistor is measured, which is a function of pressure.

Although the FSR changes its resistance as a function of the force applied at the exact touch spot, the FPSR actually integrates the currents supplied under the entire area of the touch, so that the FPSR in effect measures pressure, not the applied force.

This processing method is problematic because the FSR can have a resistance of several megohm at light touch forces, causing an extremely high output impedance when attempting to measure the position voltage. The result is that changes in the applied force can affect the measured position, even though no change in the physical touch position has occurred.

Likewise, the force measurement can be corrupted by changes in position because the supply traces will exhibit different voltage drops, depending on the touch position. Furthermore, the process of time-multiplexing between a position measurement mode and a pressure measurement mode complicates the circuit, introduces switching transients, and slows the response time.

Another difficulty arises from the construction method of two independent assemblies superimposed to measure position along orthogonal axes. When a light force is applied, it often happens that the upper assembly makes contact before the lower assembly, with the result that only the upper position measurement is valid.

Also, FSRs have a logarithmic resistance response to applied force that is only approximately linear when a small range of force is used. When the range is extended to light forces, the response has a noticeable logarithmic feel, rather than an expected linear response.

The common workaround for these deficiencies has been to set high pressure thresholds in software post-processing, in order to ensure that only the smaller FSR resistance values are used to determine whether a touch has occurred. The result is that only a restricted range of forces is allowed, reducing the useful range of touch sensitivity of the sensor.

SUMMARY OF THE INVENTION

The present invention is a touch controller that is primarily used as a man-machine interface. The touch controller comprises a touch sensor and an electronic circuit that measures the sensor, providing analog signals that indicate the position and pressure of a finger or stylus on the sensor. Many variations of the touch controller are possible.

In its most general form, the touch controller comprises a touch sensor incorporating a position resistor, a current regulator electrically connected to the touch sensor, and a differential amplifier electrically connected to the position resistor. The impedance of the position resistor changes in response to touch from a disjunct member, such as a finger or stylus. The current regulator maintains a prescribed current through the position resistor. The differential amplifier generates a position signal by amplifying the differential voltage across the position resistor, which changes as a function of the impedance of the position resistor.

To obtain a pressure signal, a common mode amplifier is electrically connected to the position resistor. The common mode amplifier generates a pressure signal by amplifying the common mode voltage across the position resistor, which also changes as a function of the impedance change of the position resistor.

The differential amplifier and the common mode amplifier may be implemented using an instrumentation amplifier, since an instrumentation amplifier performs both functions.

A touch controller that measures position along a single axis is constructed using a position resistor that has a definite length and is aligned with the position axis. The touch sensor has a left terminal electrically connected to the left end of the position resistor, and a right terminal electrically connected to the right end of the position resistor.

The differential amplifier incorporates an inverting input that is electrically connected to the left terminal, and a non-inverting input that is electrically connected to the right terminal. The voltage output of the differential amplifier is linearly proportional to the position of the disjunct member between the two ends of the position resistor.

The common mode amplifier incorporates a first input that is electrically connected to the left terminal and a second input that is electrically connected to the right terminal. The voltage output of the common mode amplifier is proportional to the pressure that the disjunct member imparts on the touch sensor.

One embodiment of a touch sensor comprises, in addition to the position resistor and the left and right terminals, a force-sensing resistor adjacent and parallel to the position resistor, a conductive trace adjacent and parallel to the force-sensing resistor, a force terminal electrically connected to the conductive trace, and an insulating membrane for electrically insulating the position resistor, the force-sensing resistor, and the conductive trace from the disjunct member. The force-sensing resistor and the conductive trace have lenghss that are comparable to the length of the position resistor. When the user presses on the touch sensor, the force-sensing resistor makes electrical contact with the conductive trace and with the position resistor, thereby changing the impedance of the position resistor.

In one embodiment of a touch controller that uses this touch sensor, the current regulator incorporates a first current output that is electrically connected to the left terminal and a second current output that is electrically connected to the right terminal. The current sourced by the first current output is equal to the current sourced by the second current output. Also, a voltage source is electrically connected to the force terminal for maintaining a constant voltage along the conductive trace.

In another embodiment of a touch controller that uses this touch sensor, a first bias resistor is electrically connected to the left terminal and a second bias resistor is electrically connected to the right terminal. A common mode amplifier is electrically connected to the left terminal and to the right terminal. The bias resistors provide a bias current across the position resistor. The common mode amplifier amplifies the common mode voltage across the position resistor. The current regulator is an operational amplifier with its inverting input electrically connected to the output of the common mode amplifier, its non-inverting input preset to a desired common mode voltage, and its output electrically connected to the force terminal. The inverting input monitors the common mode voltage across the position resistor. The output regulates the voltage along the conductive trace so that the common mode voltage across the position resistor is maintained at the desired common mode voltage, thereby maintaining a constant current through the position resistor.

In a second embodiment of a touch sensor, which comprises a position resistor with left and right terminals, the position resistor is exposed so that the disjunct member makes physical and electrical contact with the position resistor thereby changing the impedance of the position resistor.

One embodiment of a touch controller that uses this touch sensor comprises a first bias resistor electrically connected to the left terminal, a second bias resistor electrically connected to the right terminal, an oscillator electrically connected to the current regulator, and a demodulator electrically connected to the output of the differential amplifier. The bias resistors provide a bias current across the position resistor. The oscillator modulates the current regulator, which incorporates a first current output that is electrically connected to the left terminal and a second current output that is electrically connected to the right terminal, both current outputs sourcing equals currents. The oscillator causes the output of the differential amplifier to be modulated. The demodulator recovers the position signal from the output of the differential amplifier.

As an enhancement to this embodiment, a pressure signal is produced with a common mode amplifier that is electrically connected to the left terminal and to the right terminal. The common mode amplifier provides a modulated pressure signal. A second demodulator recovers the pressure signal from the modulated output of the common mode amplifier.

In a third embodiment of a touch sensor that measures position along two position axes, the position resistor has a definite area. The touch sensor incorporates a left terminal electrically connected to the left edge of the position resistor, a right terminal electrically connected to the right edge of the position resistor, a top terminal electrically connected to the top edge of the position resistor, and a bottom terminal electrically connected to the bottom edge of the position resistor.

A touch controller that uses this two-axis touch sensor would further comprise a second differential amplifier. The inverting input of the first differential amplifier is electrically connected to the left terminal and the non-inverting input is electrically connected to the right terminal. The inverting input of the second differential amplifier is electrically connected to the top bottom terminal and the non-inverting input is electrically connected to the top terminal. The voltage output of the first differential amplifier is linearly proportional to the position of the disjunct member between the left edge and the right edge of the position resistor, and the output of the second differential amplifier is linearly proportional to the position of the disjunct member between the bottom edge and the top edge of the position resistor.

Another embodiment of a two-axis touch controller comprises two single-axis touch controllers. The touch sensor of the first touch controller overlays and is orthogonal to the touch sensor of the second touch controller. The position signal from the first touch controller is linearly proportional to the position of the disjunct member along a first position axis that is aligned with the touch sensor of the first touch controller, and the position signal of the second touch controller is linearly proportional to the position of the disjunct member along a second position axis that is aligned with the touch sensor of the second touch controller.

DETAILED DESCRIPTION OF THE INVENTION

The principle object of the present invention is to provide a simple analog electronic circuit that accurately measures the position and pressure applied to a touch sensor. The circuit is intended for use with touch sensors that incorporate a resistive membrane. The outputs of the circuit are continuous voltages that represent the measured position and pressure. The circuit has the particular advantage that position measurement is fully decoupled from pressure measurement so that the full range of touch sensitivity may be realized.

The circuit has many variations that are based on the same principles. The circuit can be used with touchscreen type resistive membranes as well as force-and-position sensing resistors (FPSR). The circuit can be adapted for single-axis and two-axis position sensors.

Another object of this invention is to provide a two-axis FPSR sensor that is constructed with a single assembly, and a simple analog electronic circuit that measures the touch position and pressure of this sensor. This sensor has the advantage that the position measurements along both axes are valid simultaneously.

Another object of this invention is to provide a circuit wherein the position and pressure measurements are time-continuous functions, without the need for multiplexing.

Another object of this invention is to provide a simple analog electronic circuit that linearizes the pressure response to an applied touch.

Another object of this invention is to provide a simple analog electronic circuit that captures the attack transient when the sensor is first touched.

Figure 1:
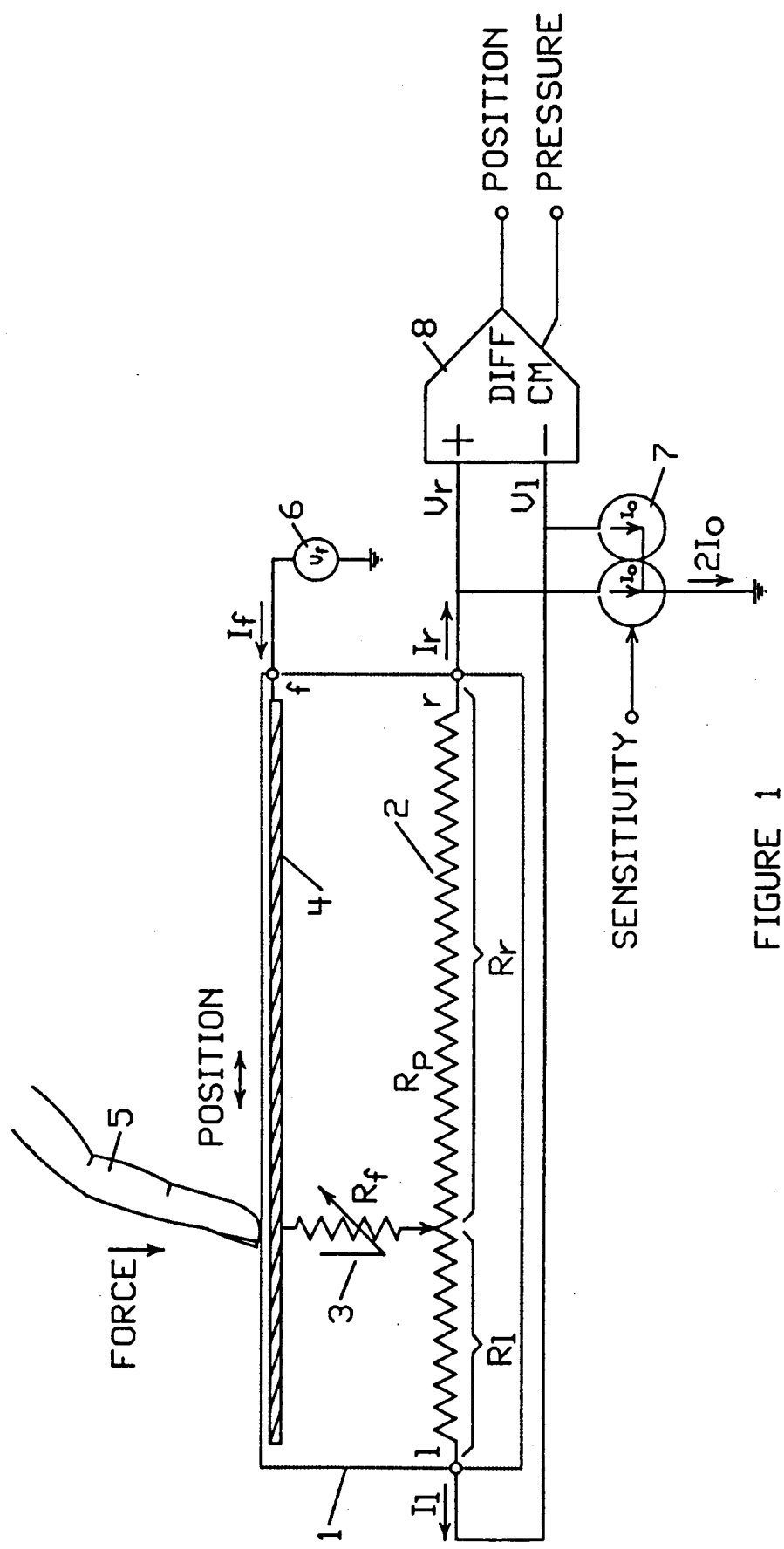
FIG. 1 shows the schematic block diagram for a single-axis pressure-sensitive touch controller that uses a force-and-position sensing resistor, a dual matched current source, and an instrumentation amplifier.

FIG. 1 shows the schematic block diagram for a touch controller that detects position along a single axis, and that employs a force-and-position sensing resistor. The touch sensor 1 is an FPSR and has three terminals labelled l (left), r (right), and f (force). Position resistor 2 is a fixed resistive layer deposited lengthwise along the position axis on an insulating substrate. Terminals l and r connect to the two ends of the position resistor which has a fixed resistance of Rp between these terminals.

Terminal f connects to a conductive layer 4 that is deposited on an insulating flexible substrate, which is also the top surface of the sensor. Over the conductive layer is deposited a force-sensing resistor (FSR) 3 that has a variable resistance of Rf between the conductive layer and the position resistor. When the user presses on the upper surface of the touch sensor with a finger 5, or some other stylus, the FSR responds to the applied force by changing the resistance of Rf under the touch-point.

Although the FSR changes its resistance in response to force, the resulting current at terminal f is the integral of all currents in the area beneath the finger, in effect measuring pressure.

The touch point divides the position resistor into two smaller resistor segments, Rl and Rr, which always sum to the fixed position resistor:

$$Rp = Rl + Rr$$

The l and r terminals are described electrically by currents Il and Ir, and voltages Vl and Vr, respectively. The f terminal draws current If. The voltage across the FSR is given by (If Rf), and the voltages across the position resistor segments are given by (Il Rl) and (Ir Rr). Because the touch point electrically connects Rl, Rr, and Rf, the current flowing through resistor Rf is equal to the sum of the currents flowing through resistor segments Rl and Rr:

$$If = Il + Ir$$

Voltage source 6 is connected to terminal f of the touch sensor, providing a constant voltage, Vf. Dual matched current source 7 is connected to the l and r terminals of the touch sensor. The current source is programmed to draw a constant current 2 Io, that is divided equally between its source terminals. The SENSITIVITY voltage is set to program the current source to achieve an optimal range of touch sensitivity.

Instrumentation amplifier 8 is also connected to the l and r terminals of the touch sensor, where it senses voltages Vl and Vr. Two outputs are provided on the instrumentation amplifier: the differential voltage between the inputs (DIFF), and the common mode voltage between the inputs (CM). The differential voltage is interpreted as the POSITION signal, and the common mode voltage is interpreted as the PRESSURE signal.

The inputs of the instrumentation amplifier draw negligible current, so that the dual matched current source behaves as if it were connected only to the touch sensor:

$$Il = Ir = Io$$

$$If = 2 Io$$

The voltages at the l and r terminals of the touch sensor are given by the voltage drops across the resistors in the touch sensor:

$$Vl = Vf - If\,Rf - Il\,Rl = Vf - 2\,Io\,Rf - Io\,Rl$$

$$Vr = Vf - If\,Rf - Ir\,Rr = Vf - 2\,Io\,Rf - Io\,Rr$$

The differential output of the instrumentation amplifier is the difference between voltages Vl and Vr, multiplied by a constant gain factor, K:

$$position = K\,(Vr - Vl) = K\,Io\,(Rl - Rr)$$

Because Io is fixed by the current source, the position voltage is linearly proportional to the difference between the position resistor values. In particular, it can be seen that the position voltage is independent from the value of the force-sensing resistor and from the reference voltage, without approximation.

The amplifier gain K can be set at an appropriate scale factor so that the relationship between touch position and the position voltage is known. This is useful for matching the position voltage range to the input voltage range of an analog-to-digital converter.

The common mode output of the instrumentation amplifier is the average between voltages Vl and Vr:

$$\begin{aligned}pressure &= (Vl + Vr)/2 = Vf - 2IoRf - Io(Rl + Rr)/2 \\ &= (Vf - IoRp/2) - 2IoRf\end{aligned}$$

Because Vf, Io, and Rp are fixed values, the pressure voltage is linearly proportional to the resistance of the FSR, Rf. In particular, it can be seen that the pressure voltage is independent of the touch position, without approximation.

When no force is applied, Rf has its largest value, which could be several Megohm for an FSR. As a result, the current source has reached its compliance limit, and the PRESSURE voltage is at a minimum. As the applied force is increased, Rf decreases and the pressure voltage increases to a maximum of (Vf−Io Rp/2). Sensitivity to light applied forces is increased by decreasing Io so that for the largest expected Rf, the product Io Rf does not reach the compliance limit of the current source.

In summary, the device of FIG. 1 functions by holding the f terminal of the touch sensor at constant voltage. The common mode voltage between the l and r terminals is allowed to vary with the applied force, as a result of the condition that the current through the touch sensor is regulated so that it is constant.

Figure 2:
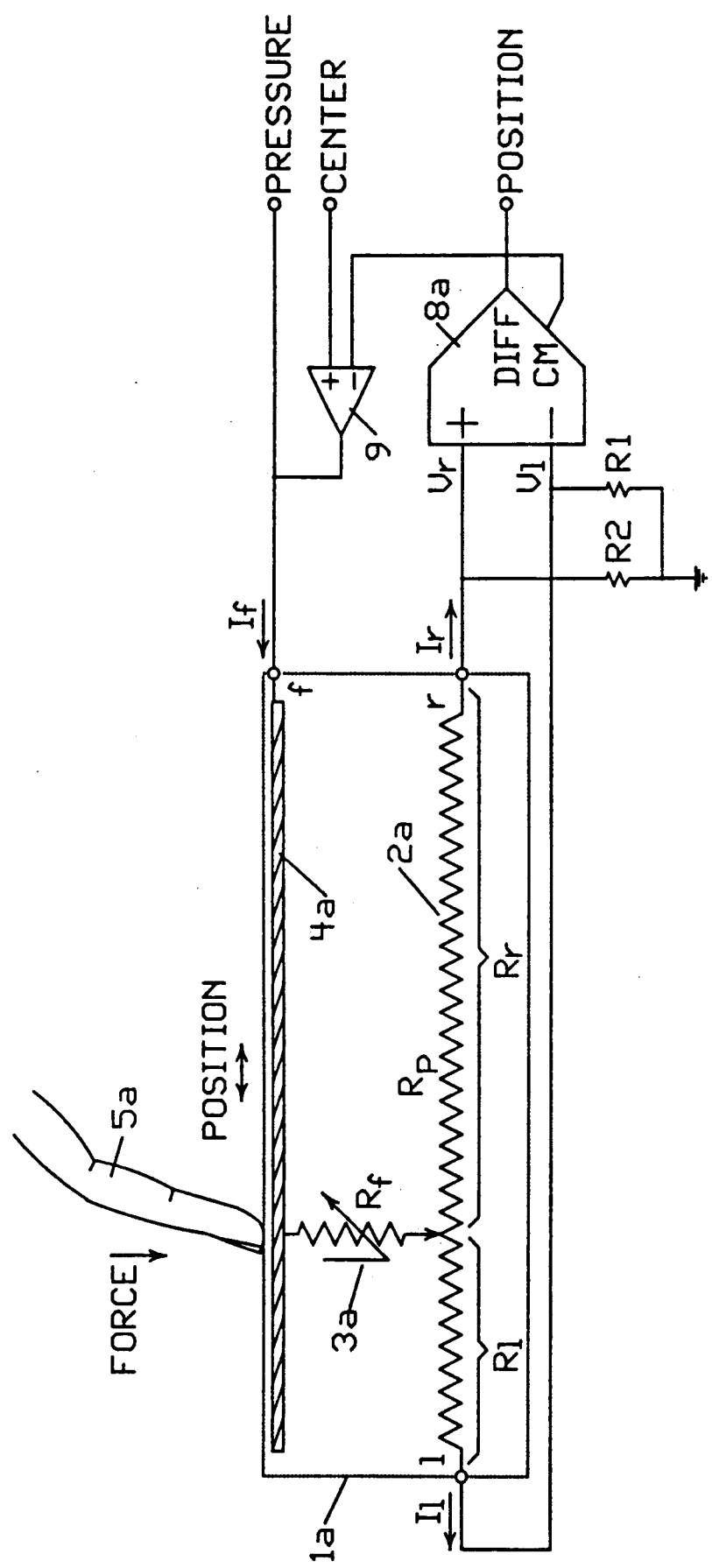
FIG. 2 shows the schematic block diagram for a single-axis pressure-sensitive touch controller that uses a force-and-position sensing resistor and an instrumentation amplifier in the feedback loop of an operational amplifier.

FIG. 2 shows the schematic block diagram for a device similar to the device of FIG. 1, with an alternative electronic circuit. In the device of FIG. 2, the common mode voltage between the l and r terminals of the touch sensor 1a remains fixed. The voltage at the f terminal will be varied as a function of the applied force, again under the condition that the current through the touch sensor remains constant.

The touch sensor is identical to the sensor in FIG. 1, with position resistor 2a, force-sensing resistor 3a, and conductive layer 4a. Force is similarly applied to the touch sensor with a finger 5a or some other stylus.

In this circuit, two matched resistors R1 and R2 are connected to the l and r terminals of the touch sensor, respectively. These resistors provide currents Il and Ir which produce voltages Vl and Vr. Instrumentation amplifier 8a detects the differential voltage and common mode voltage between these terminals.

The criterion for regulating constant current through the touch sensor is that the common mode voltage between Vl and Vr should be maintained at a constant CENTER voltage. When the common mode voltage across R1 and R2 is constant, the sum of the currents through R1 and R2 is constant, and therefore the current through the touch sensor is constant, again because the instrumentation amplifier draws negligible current.

Operational amplifier 9 functions as the current regulator. OpAmp 9 compares the common mode voltage, as detected by the instrumentation amplifier 8a, to a fixed CENTER voltage, which is programmed as the ideal common mode voltage about which Vl and Vr should swing. In response to any error between the measured common mode voltage and the fixed center voltage, OpAmp 9 regulates its output so that the voltage at the f terminal of the touch sensor exactly satisfies the constant current criterion.

The output of OpAmp 9 is interpreted as the pressure voltage, because it changes as a function of the FSR value and consequently as a function of the touch pressure. The operation of the circuit may also be analyzed from the perspective that both the touch sensor 1a and the instrumentation amplifier 8a are within the feedback loop of OpAmp 9.

The design condition R1=R2>>Rp should be met in order to increase the linearity of the position measurement as a function of finger position. Some small amount of nonlinearity results because Rr/R2 and Rl/R1 form voltage dividers, so that currents Il and Ir will not be exactly equal, but they are more closely equal as R1 and R2 increase.

The circuit of FIG. 2 has the advantage that matched resistors are employed instead of matched transistors (in the dual current source), which in some circumstances is an easier design constraint to satisfy. However, because the touch sensor is in the feedback loop of OpAmp 9, this circuit has a greater susceptibility to oscillations occurring because of a large capacitance presented by the touch sensor at the output of the OpAmp. Oscillations can be overcome by compensating the feedback network, however this slows the response time.

Figure 3:
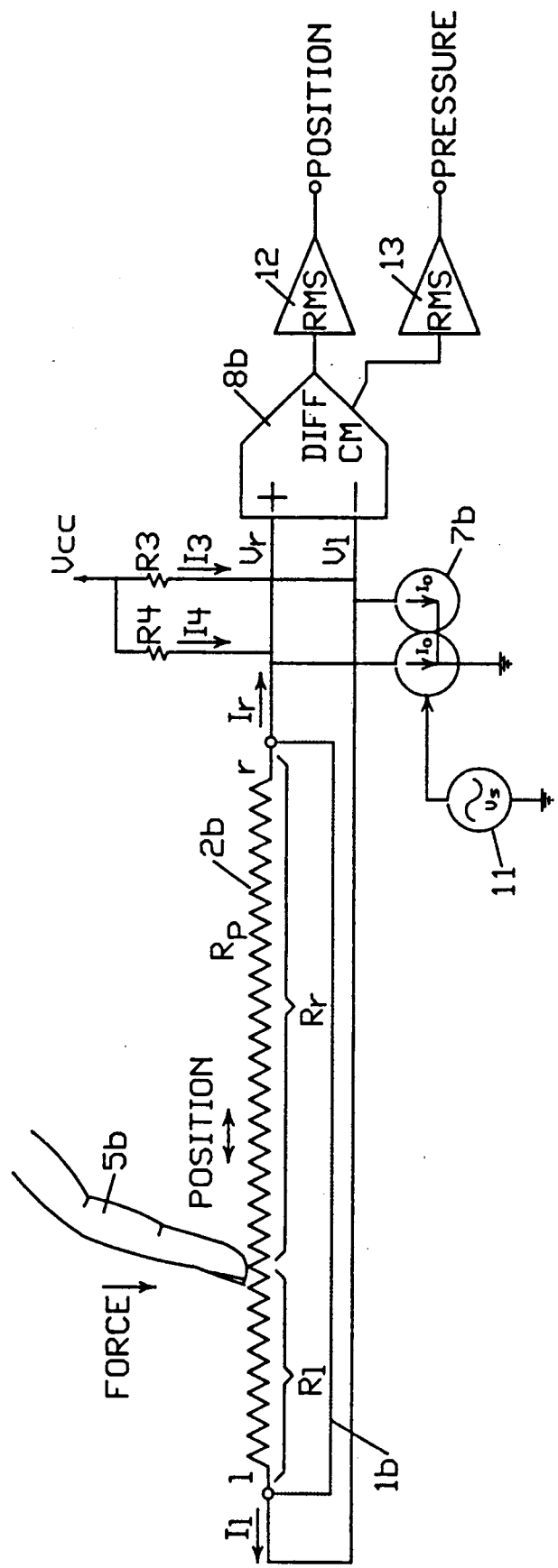
FIG. 3 shows the schematic block diagram for a single-axis pressure-sensitive touch controller that uses a resistive coating touch sensor, a dual matched current source modulated by a periodic signal, an instrumentation amplifier, and two RMS detectors.

FIG. 3 shows the schematic block diagram for a single-axis touch controller that employs a resistive coating touch sensor 1b. This touch sensor is simply a resistive coating deposited on a glass or plastic substrate, with contacts at either end of the resistive coating. Touch sensors of this type are commonly found in interactive touch screens for computer terminals.

A finger 5b that touches the surface of the sensor makes physical contact with the resistive coating 2b and presents an electrical impedance at the touch point. The resistive coating is connected at terminals l and r, and has a fixed resistance of Rp, between the l and r terminals. The touch point divides the resistive coating into two resistor segments, Rl and Rr.

A dual matched current source 7b is connected to the l and r terminals of the touch sensor. The programmed current is modulated by a sinusoidal voltage generated by oscillator 11. The current source in this circuit is time-varying because the impedance presented by a human touch to a time-varying voltage is more predictable than to a constant voltage.

Two matched resistors, R3 and R4, provide a current path from the power supply (Vcc), so that a nominal voltage at the l and r terminals is maintained that varies with the oscillator output. The differential voltage and common mode voltage between the l and r terminals of the touch sensor are detected by instrumentation amplifier 8b.

The analysis of this circuit is similar to the device in FIG. 1, however the position and pressure voltages, which were functions of a fixed Io, are now functions of a time-varying Io. Also, two fixed resistors provide a bias current at the l and r terminals of the touch sensor.

Because many factors influence the impedance of the touch point, some of which are indeterminate, the pressure voltage is not as predictable as the pressure voltages of the devices in FIG. 1 and FIG. 2. These factors include humidity of the air, surface conductivity of the finger or stylus, and the capacitive and inductive parameters of the finger or stylus.

Two RMS detectors (root-mean-square) 12 and 13 recover the position and pressure signals from the differential and common mode outputs of the instrumentation amplifier 8b. These detectors may be any type of rectifying detector or synchronous detector. Their function is to de-modulate the outputs of the instrumentation amplifier because the amplitudes of the modulated signals are the desired parameters.

Figure 4:
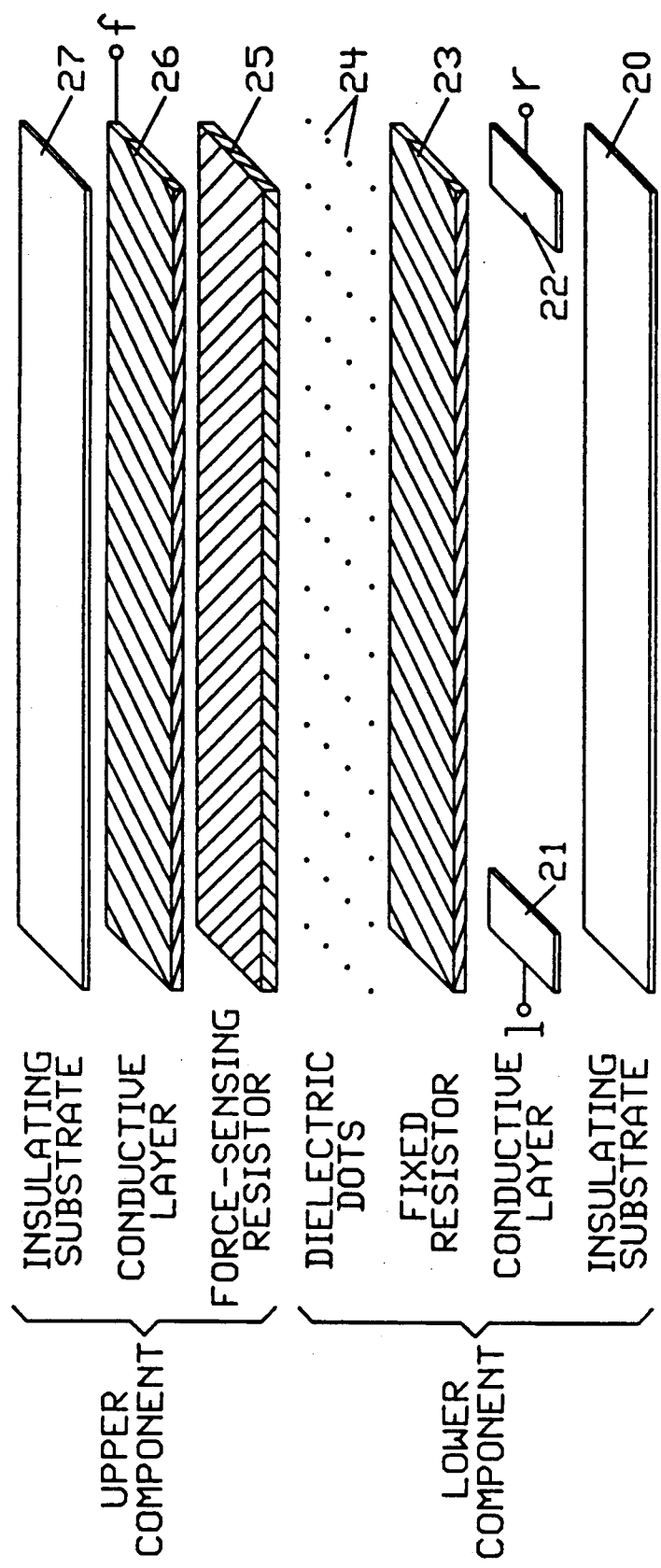
FIG. 4 shows the construction of one embodiment of a force-and-position sensing resistor.

FIG. 4 shows one method of constructing the single position axis touch sensor that is employed in the devices of FIG. 1 and FIG. 2. The touch sensor is a "sandwich" of an upper component overlaying and loosely fastened to a lower component.

The lower component is based upon an insulating substrate 20 that may be a thin flexible membrane that overlays a rigid support, or may in itself be a rigid support, such as a printed circuit board. Two contacts 21 and 22 are deposited over the insulating substrate 20 and provide the l and r terminals, respectively. A fixed resistor layer 23 is deposited over the conductive layer and insulating substrate. An array of thin dielectric dots 24 is deposited over the fixed resistor. The dielectric dots separate the upper component from the lower component when there is no force applied to the touch sensor.

The upper component is based upon an insulating substrate 27 that is a thin flexible membrane. The properties of the insulating substrate, such as flexibility and roughness of its upper surface, are important because the user touches this surface. A less flexible membrane would distribute the touch force over a greater area, and a more rough surface would fatigue the user. A conductive layer 26 is deposited beneath the insulating substrate, and provides the f terminal. Finally, a force-sensing resistor 25 is deposited beneath the conductive layer.

When a user applies force to the insulating substrate of the upper component 27, the force-sensing resistor 25 contacts the fixed resistor 23, making an electrical connection. Increasing the applied force decreases the value of the force-sensing resistor, thereby decreasing the resistance between the f terminal and the l and r terminals. Moving the touch point to the left lowers the resistance between the l terminal and the f terminal, and increases the resistance between the r terminal and the f terminal by an equal amount.

Figure 5:
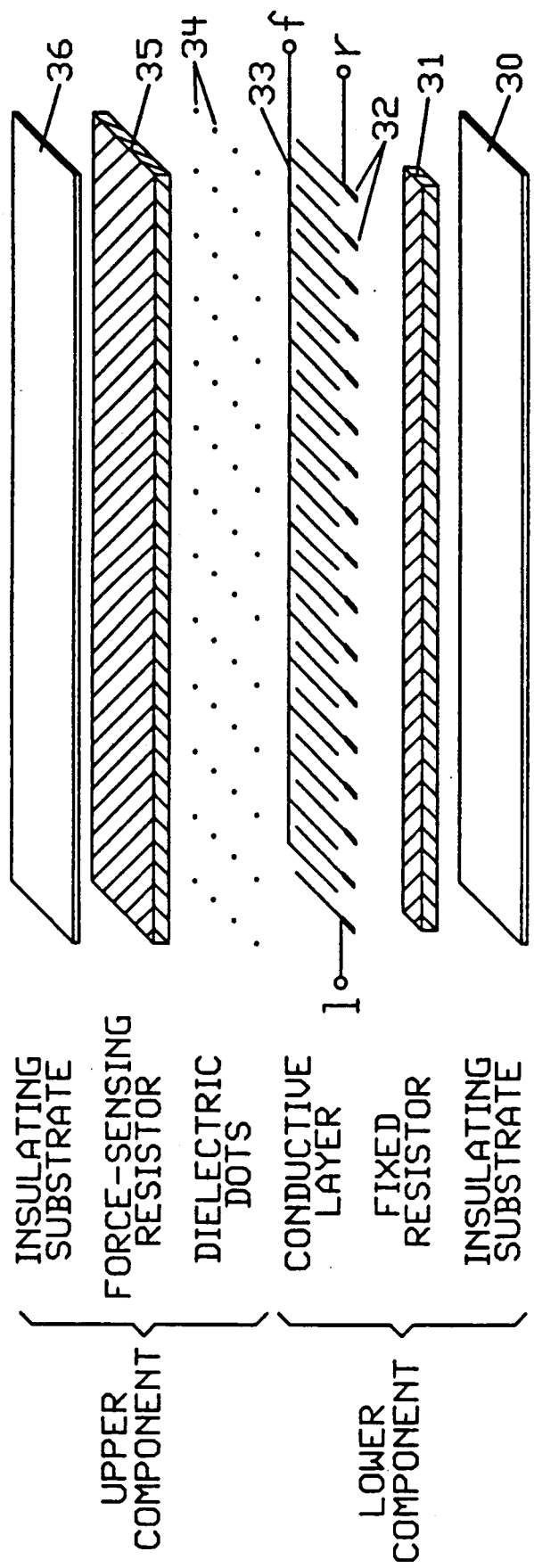
FIG. 5 shows the construction of a second embodiment of a force-and-position sensing resistor.

FIG. 5 shows another method of constructing the single position axis touch sensor, which is also constructed of a "sandwich" of a lower component and an upper component.

The lower component is likewise based on an insulating substrate 30. A fixed resistor 31 is deposited on the insulating substrate. The fixed resistor is shaped as a thin strip, and is deposited lengthwise along the front edge of the insulating substrate.

A conductive layer is deposited over the fixed resistor and insulating substrate. The conductive layer has a first set of traces 32 that are unconnected from each other, but that make physical and electrical contact along the fixed resistor. The leftmost trace provides the l terminal, and the rightmost trace provides the r terminal. The conductive layer has a second set of traces 33 that are interdigitated with the first set. All of the traces of the second set are electrically connected with a common trace that provides the f terminal.

The upper component is also based on an insulating substrate 36 that is thin and flexible. A force-sensing resistor 35 is deposited beneath the insulating substrate. An array of dielectric dots 34 is deposited beneath the force-sensing resistor.

When a user applies force to the insulating substrate of the upper component 36, the force-sensing resistor makes physical and electrical contact with the traces of the conductive layer 32 and 33. Without such force, traces 32 are completely insulated from traces 33. When the force-sensing resistor contacts the traces, it provides a variable resistance in series between the f terminal and the fixed resistor, which is connected to the l and r terminals. In other respects, the touch sensor of FIG. 5 behaves similarly to the touch sensor of FIG. 4.

Figure 6:
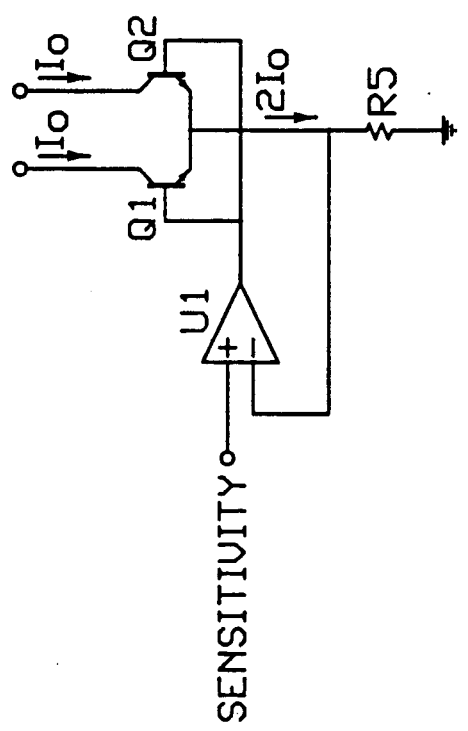
FIG. 6 shows the electronic schematic for a dual matched current source.

FIG. 6 shows the electronic schematic for the dual matched current source, though other circuits are possible. Transistors Q1 and Q2 are a matched NPN pair on a common substrate, such as LM394. The collectors of Q1 and Q2 are the current source terminals.

Operational amplifier U1 regulates the currents sourced by Q1 and Q2, which are summed into resistor R5. Because U1 controls the bases of Q1 and Q2 and they are a matched pair, the currents drawn by Q1 and Q2 should be very nearly equal. Unless otherwise specified, all OpAmps should be low-noise FET-input types such as LF353.

OpAmp U1 monitors the resulting voltage over R5, and ensures that this voltage is equal to the programmed SENSITIVITY voltage by adjusting the base voltage at Q1 and Q2. Thus the SENSITIVITY voltage is used to program the current source, according to:

$$Io = \text{SENSITIVITY}/(2\ R5)$$

Figure 7:
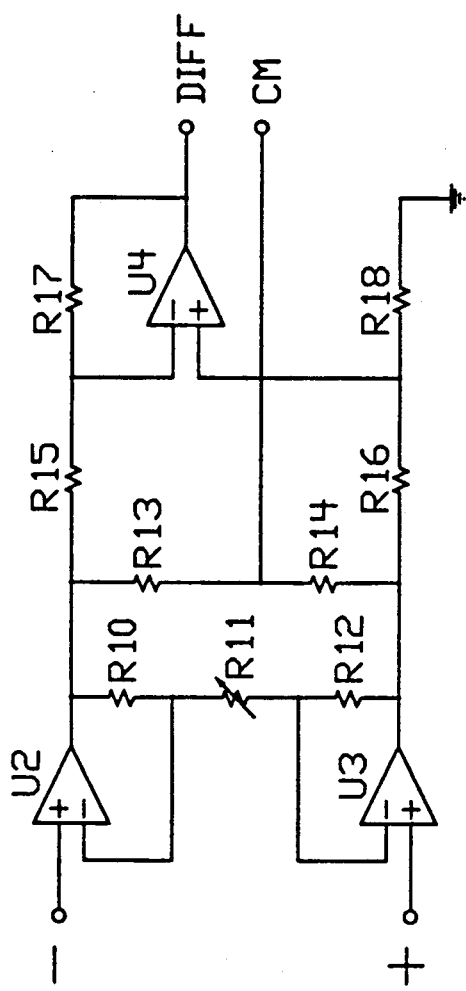
FIG. 7 shows the electronic schematic for an instrumentation amplifier.

FIG. 7 shows the electronic schematic for an instrumentation amplifier, though other circuits are possible. OpAmps U2, U3, and U4 should have very low input-voltage offsets and very high-impedance inputs, such as OP-07. Resistors pairs R10 and R12; R15 and R16; and R17 and R18 should be matched precision resistors.

The differential signal gain of the front end of the instrumentation amplifier, which uses OpAmps U2 and U3, is given by (1+2 R10/R11), where R11 can be made adjustable to trim the gain of the whole amplifier. The common mode signal gain of the front end is 1. The differential signal gain of the differencing amplifier, which uses OpAmp U4, is given by (R17/R15), while the common mode signal gain is zero. The overall differential signal gain, K, of the instrumentation amplifier is given by:

$$K = (R17/R15)(1 + 2R10/R11)$$

If precision components are used, the differential voltage signal should exhibit a very high common mode signal rejection.

Resistors R13 and R14 form a voltage divider between the outputs of OpAmps U2 and U3. This voltage divider creates the common mode voltage output because the common mode signal gain of the front end is unity. Resistors R13 and R14 need not be precision parts. Some integrated circuit instrumentation amplifiers, such as the LH0036, provide a "guard drive output" which is equivalent to the common mode signal output.

Figure 8:
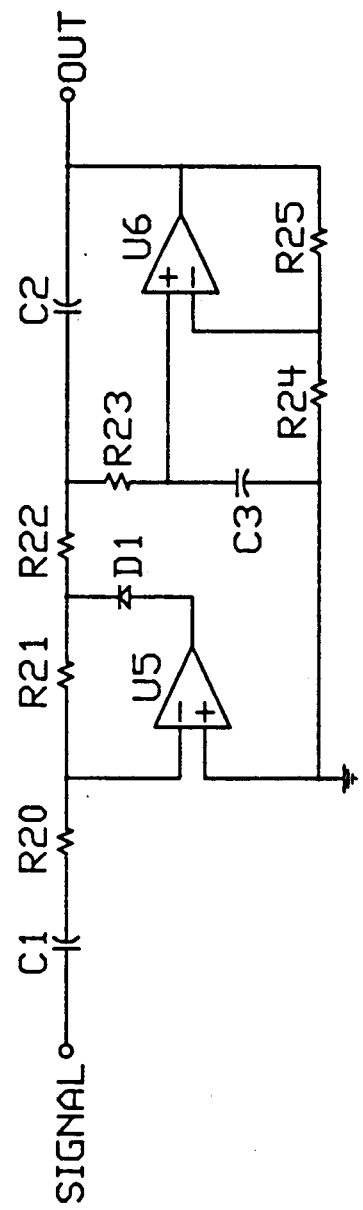
FIG. 8 shows the electronic schematic for an RMS detector.

FIG. 8 shows the electronic schematic for an RMS detector, though other circuits are possible. The SIGNAL input, which comes from the instrumentation amplifier, is AC-coupled through capacitor C1 into OpAmp U5, which is configured as a half-wave rectifier. A full-wave rectifier may also be used, but with greater circuit complexity.

OpAmp U6 is configured as a VCVS two-pole lowpass filter, which filters the time-varying component of the rectified SIGNAL. The filter should be designed to have a cutoff frequency well below the oscillator frequency. The output of the lowpass filter is the average magnitude of SIGNAL.

Figure 9:
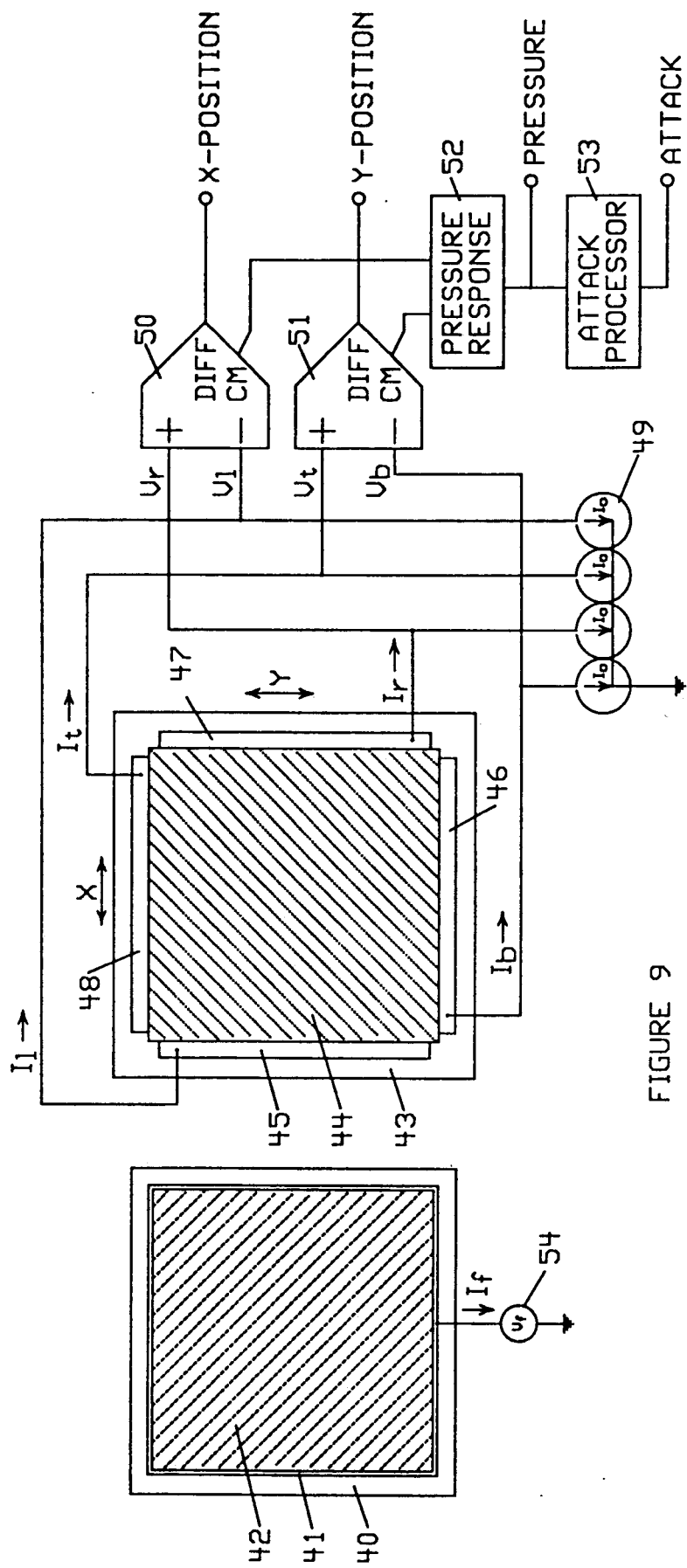
FIG. 9 shows the schematic block diagram for a two-axis pressure-sensitive touch controller with a pressure response circuit and an attack processor circuit.

FIG. 9 shows a preferred embodiment of the invention, which uses a two-axis touch sensor employing a force-and-position sensing resistor (FPSR). The electronic circuit and sensor are adapted from the device in FIG. 1, providing X-POSITION and Y-POSITION signals. The embodiment further features post-processing of the pressure measurements to provide a linearized PRESSURE signal and an ATTACK signal.

The two-axis touch sensor is constructed similarly to the single-axis touch sensor of FIG. 4. Rather than a long rectangular shape with two contacts at the short edges, the two-axis touch sensor has a square pattern with contacts along all four edges.

The upper component of the touch sensor is based on an insulating substrate 40, which is a thin, flexible membrane. A conductive layer 41 is deposited on the substrate, and provides the f terminal. A force-sensing resistor 42 is deposited on the conductive layer. Dielectric dots may be deposited over the force-sensing resistor.

The lower component of the touch sensor is based on an insulating substrate 43. Four narrow electrical contacts 45, 46, 47, and 48 are deposited along the four sides of the insulating substrate. The left contact 45 and the right contact 47 detect current flow in the X direction, and provide the l and r terminals, respectively. The top contact 48 and the bottom contact 46 detect current flow in the Y direction, and provide the t and b contacts, respectively. A fixed resistor 44 is deposited over the four contacts and the insulating substrate.

The f terminal is connected to a voltage source 54 that maintains the conductive layer at Vf volts.

The l, r, t, and b terminals are connected to a quad matched current source 49. The quad matched current source is similar to the dual matched current source of FIG. 6 except there are two additional source terminals (i.e. four matched transistors).

The l and r terminals are connected to a first instrumentation amplifier 50, and the t and b terminals are connected to a second instrumentation amplifier 51. The differential outputs of the instrumentation amplifiers are the X-POSITION and Y-POSITION signals. Likewise, the common mode voltage outputs are the X-PRESSURE and Y-PRESSURE signals.

The force-sensing resistor has a logarithmic response to the touch force, so that most of the range of the X-PRESSURE and Y-PRESSURE signals is traversed when the touch force is light, and the range compresses as the touch force is increased. The effect to the user is a non-linear pressure response that is difficult to control over a wide range. This condition is exacerbated when Io is set to a very low current in order to achieve maximum touch sensitivity.

In order to compensate so that the controlling device has a much greater range of touch sensitivity, the PRESSURE RESPONSE circuit 52 transforms the pressure by applying an exponential scaling. Because only a single pressure output is desired, this circuit also sums the X-PRESSURE and Y-PRESSURE signals. The pressure signals are summed before exponential conversion, so the linearized pressure signal is the product of the X-PRESSURE and Y-PRESSURE components.

It is sometimes desirable to measure the attack transient when force is first applied to the touch sensor, as in a tapping gesture. The attack transient can be used, for example, in a musical context to modulate the timbre of a note, or in a mouse emulator to simulate the "click" of a mouse button. The two methods for generating the attack transient are either to calculate it in software by observing the change in pressure over time, or to provide an analog circuit that performs this function.

Typically, when a computer samples the parameters of a gestural input device, sampling rates on the order of 50 Hz to 200 Hz are adequate for tracking continuous changes so that they are perceived as smooth. However, the attack transient is often shorter than this 1/5 to 2 msec sampling period, and occurs asynchronously, causing inconsistent results if the attack transient is to be calculated in software.

For this reason, an ATTACK PROCESSOR 53 has been added to the preferred embodiment so that the brief attack transient may be reliably captured. The ATTACK PROCESSOR continuously differentiates the pressure signal with respect to time in order to enhance the transient, then holds the peak value of the transient while the touch pressure is maintained. A computer may then read an accurate attack signal even after the attack transient has passed.

Figure 10:
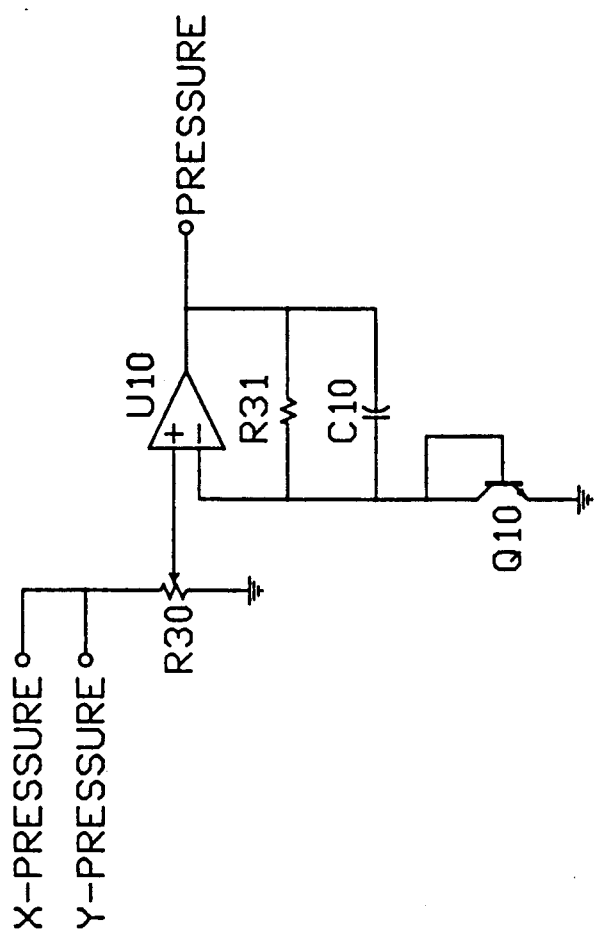
FIG. 10 shows the electronic schematic for a pressure response circuit.

FIG. 10 shows the electronic schematic for the PRESSURE RESPONSE circuit, though other circuits are possible. The X-PRESSURE and Y-PRESSURE signals are passively summed into potentiometer R30, which is configured as a voltage divider. The value of R30 should be much smaller than the output impedance of the common mode signal output of the instrumentation amplifier.

OpAmp U10 is configured as a non-inverting amplifier, except that transistor Q10 is tied to the inverting input (−) of U10 in order to cause an exponential voltage gain response. The voltage at Q10's base rise at approximately 60 mv per decade of collector current, so R30 sets the response curve of the pressure signal by scaling the sum of the X-PRESSURE and Y-PRESSURE voltages with respect to Q10's exponential response. R31 sets the linear gain of the amplifier, and C10 dampens the response to attenuate noise that was picked up from the touch sensor. The output of U10 is the PRESSURE signal.

Figure 11:
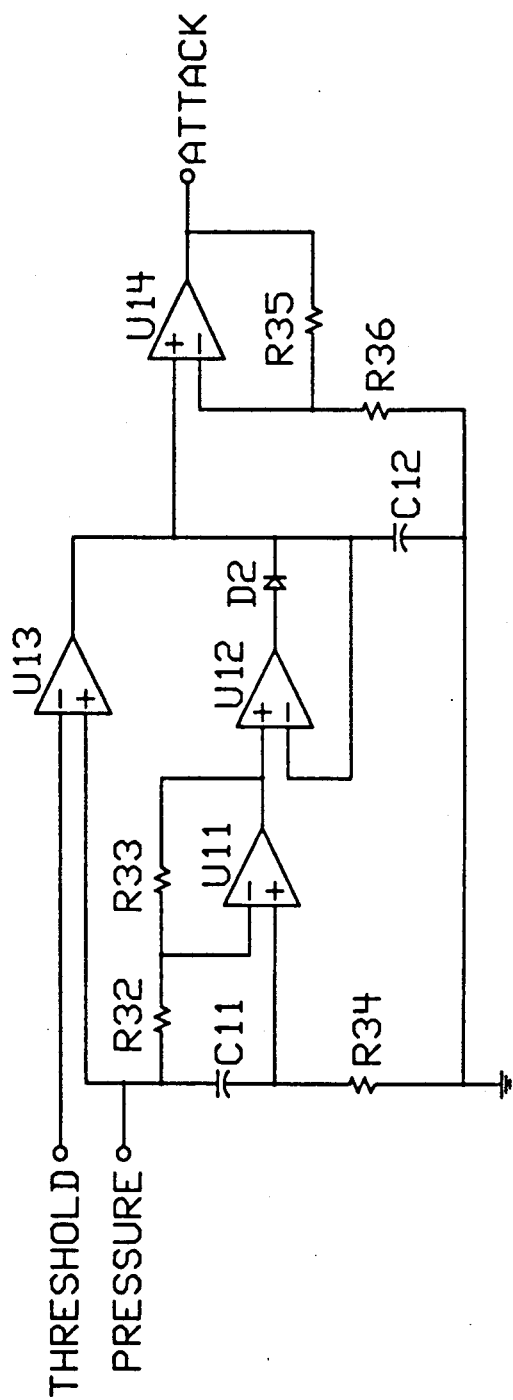
FIG. 11 shows the electronic schematic for an attack processor circuit.

FIG. 11 shows the electronic schematic for the ATTACK PROCESSOR, though other circuits are possible. OpAmp U11 is configured as a lead-phase processor, where R33=R34, (R33/R32) sets the gain, and C11 sets the lead-phase time constant. Lead-phase processors are typically used to cause a phase shift in a periodic signal, however here U11 simply acts to differentiate the PRESSURE signal with respect to time, passing the attack transient and blocking the constant component.

OpAmp U12 is configured as a peak voltage detector, with the maximum transient voltage from the output of U11 held by diode D2 and capacitor C12.

OpAmp U14 is configured as a noninverting amplifier that buffers the peak voltage held on capacitor C12, and has gain of (1+R35/R36).

Comparator U13 is an open-collector output type, such as LM339, that compares the pressure signal to a preset voltage THRESHOLD. Whenever the PRESSURE signal falls below THRESHOLD, signifying that force has been removed from the touch sensor, the output of U13 is grounded, discharging capacitor C12, and thus resetting the peak detector. When a force exists on the touch sensor, the output of U13 will be in an open state, so it will not affect the voltage held on C12.

The implementations described above present just several examples of many possibilities for circuit implementation and touch sensor construction adapted from the basic principle of this invention. In particular, a touch controller that accurately measures the touch point may be constructed using a touch sensor with a position resistor and a current source connected across the position resistor. The touch position is accurately measured with a differential amplifier connected across the position resistor, and the touch pressure is accurately measured with a common mode amplifier connected across the position resistor.

The embodiments of touch controllers based on this invention solve many of the problems of prior devices, such as the need for analog dividers, a limited range of touch sensitivity, the need to time-multiplex between position and pressure measurement modes, a coupling between position and pressure measurements, non-linear pressure response, difficulty in capturing an attack transient, and, in two-axis touch sensors, the inconsistency of occasionally having one axis providing valid measurements while the other axis does not.

A great many variations on the embodiments presented above are possible. The standard electronics literature provides many methods of constructing current sources and sinks as well as instrumentation amplifiers. The sense of voltage in each circuit is easily reversed (i.e. positive versus negative voltages). The circuits may be constructed using bipolar power supplies or single-sided power supplies. Many variations for the current regulation scheme are possible using an operational amplifier to monitor the current being drawn by the touch sensor.

Many touch sensor designs are possible, which include single-axis and two-axis resistive elements, exposed resistive elements, enclosed resistive elements, resistive wires and sheets, resistive coatings deposited on glass or plastic, and force-and-position sensing resistors. Touch controllers are often touched with a finger, however other means might be appropriate in different situations, such as a stylus.

Accordingly, the scope of the invention should be determined not by the embodiments illustrated, but by the appended claims and their legal ramifications.

What is claimed:

1. A touch controller comprising:
   (a) a touch sensor comprising a position resistor having a definite length wherein the impedance of the position resistor changes in response to touch from a disjunct member;
   (b) a current regulator electrically connected to the touch sensor for generating a pressure signal by maintaining a prescribed current through the touch sensor whereby the voltage produced by the current regulator changes as a function of the pressure applied to the touch sensor by the disjunct member; and
   (c) a differential amplifier electrically connected to the position resistor for generating a position signal by amplifying the differential voltage across the length of the position resistor whereby the differential voltage across the length of the position resistor changes as a function of the position of the disjunct member on the touch sensor.

2. A touch controller as recited in claim 1, wherein the touch sensor further comprises:
   (a) a force-sensing resistor for changing the impedance of the position resistor as a function of the pressure applied to the touch sensor by the disjunct member;
   (b) a conductive trace for supplying current to the force-sensing resistor; and
   (c) an insulating membrane for electrically insulating the position resistor, the force-sensing resistor, and the conductive trace from the disjunct member whereby the force-sensing resistor makes electrical contact with the position resistor and with the conductive trace as a result of the disjunct member imparting a force upon the insulating membrane.

3. A touch controller as recited in claim 2, wherein the current regulator incorporates two matched outputs electrically connected to either end of the position resistor thereby generating two pressure signals, and further comprising:
   (a) a voltage source electrically connected to the conductive trace for maintaining a constant voltage along the conductive trace; and
   (b) a common mode amplifier electrically connected to the position resistor for generating an average pressure signal by amplifying the common mode voltage across the length of the position resistor whereby the common mode voltage across the length of the position resistor is the average of the two pressure signals.

4. A touch controller as recited in claim 2, wherein the current regulator is electrically connected to the conductive trace, and further comprising a voltage source electrically connected to one end of the position resistor for maintaining one end of the position resistor at a constant voltage.

5. A touch controller as recited in claim 2, wherein the current regulator is electrically connected to the conductive trace, and further comprising a voltage source and a bias resistor electrically connected to the voltage source and electrically connected to one end of the position resistor for providing a voltage bias at one end of the position resistor.

6. A touch controller as recited in claim 5, further comprising a second bias resistor electrically connected to the voltage source and electrically connected to opposite end of the position resistor for providing a voltage bias at the opposite end of the position resistor.

7. A touch controller as recited in claim 1, wherein the position resistor is exposed so that the disjunct member makes physical and electrical contact with the position resistor thereby changing the impedance of the position resistor; wherein the current regulator incorporates two matched outputs electrically connected to either end of the position resistor; and further comprising:
   (a) two bias resistors electrically connected to either end of the position resistor for providing a bias current through the touch sensor;
   (b) a common mode amplifier electrically connected to the position resistor for generating an average pressure signal by amplifying the common mode voltage across the length of the position resistor;
   (c) an oscillator electrically connected to the current regulator for modulating the prescribed current thereby modulating the common mode voltage across the position resistor and modulating the differential voltage across the position resistor;
   (d) a first demodulator electrically connected to the differential amplifier for demodulating the position signal; and
   (e) a second demodulator electrically connected to the common mode amplifier for demodulating the average pressure signal.

8. A touch controller as recited in claim 1, further comprising an exponential converter circuit for converting the pressure signal having a logarithmic response into a pressure signal having a linear response.

9. A touch controller as recited in claim 1, further comprising an attack hold circuit for producing an attack signal by enhancing and holding the transient in the pressure signal that results when the disjunct member initially contacts the touch sensor.

10. A touch controller as recited in claim 1, wherein the position resistor has a definite width and further comprising a second differential amplifier electrically connected to the position resistor for generating a second position signal by amplifying the differential voltage across the width of the position resistor whereby the differential voltage across the width of the position resistor changes as a function of the position of the disjunct member on the touch sensor.

11. A touch controller as recited in claim 1, further comprising a second touch controller as recited in claim 1 wherein the touch sensor of the first touch controller overlays and is orthogonal to the touch sensor of the second touch controller.

* * * * *